June 26, 1923.

M. KOTT

COOKING DEVICE

Filed June 26, 1922

WITNESSES

INVENTOR
Michael Kott

ATTORNEYS

June 26, 1923.

M. KOTT

COOKING DEVICE

Filed June 26, 1922

WITNESSES
Frederick Diehl
E. W. Savage

INVENTOR
Michael Kott
BY Munn & Co.
ATTORNEYS

UNITED STATES PATENT OFFICE.

MICHAEL KOTT, OF NEW YORK, N. Y.

COOKING DEVICE.

Application filed June 26, 1922. Serial No. 570,854.

*To all whom it may concern:*

Be it known that I, MICHAEL KOTT, a citizen of Russia, and a resident of the city of New York, borough of Manhattan, in the county and State of New York, have invented new and useful Improvements in Cooking Devices, of which the following is a full, clear, and exact description.

This invention relates to cooking devices primarily designed for cooking meats.

Usually in the process of cooking meats they are placed in a vessel located in a certain definite position with respect to the source of heat. The result is that great attention has to be given during the cooking process in order to prevent the meat from being burned. Often it is necessary to add a grease or some other means to prevent the meat from burning or sticking to the vessel in which it is being cooked. If grease is added, it makes the food unfit for consumption by certain people; while if water is added during the cooking process, a certain amount of nourishment is removed from the meat and lost in the water.

The general object of this invention is the provision of a simple and efficient cooking device in which food may be cooked without the use of any means for preventing it from sticking to the cooking vessel or from burning.

This object is accomplished by providing a drum in which means for supporting the victuals to be cooked is located, and rotatably mounting said drum so that when placed above a source of heat it may be rotated so as to continually change the area which is directly in line with the flow of heat.

This and other objects of the invention will be more clearly understood from the following detailed description and accompanying drawings.

Figure 6 is a perspective view of a modified form of container.

Figure 1:
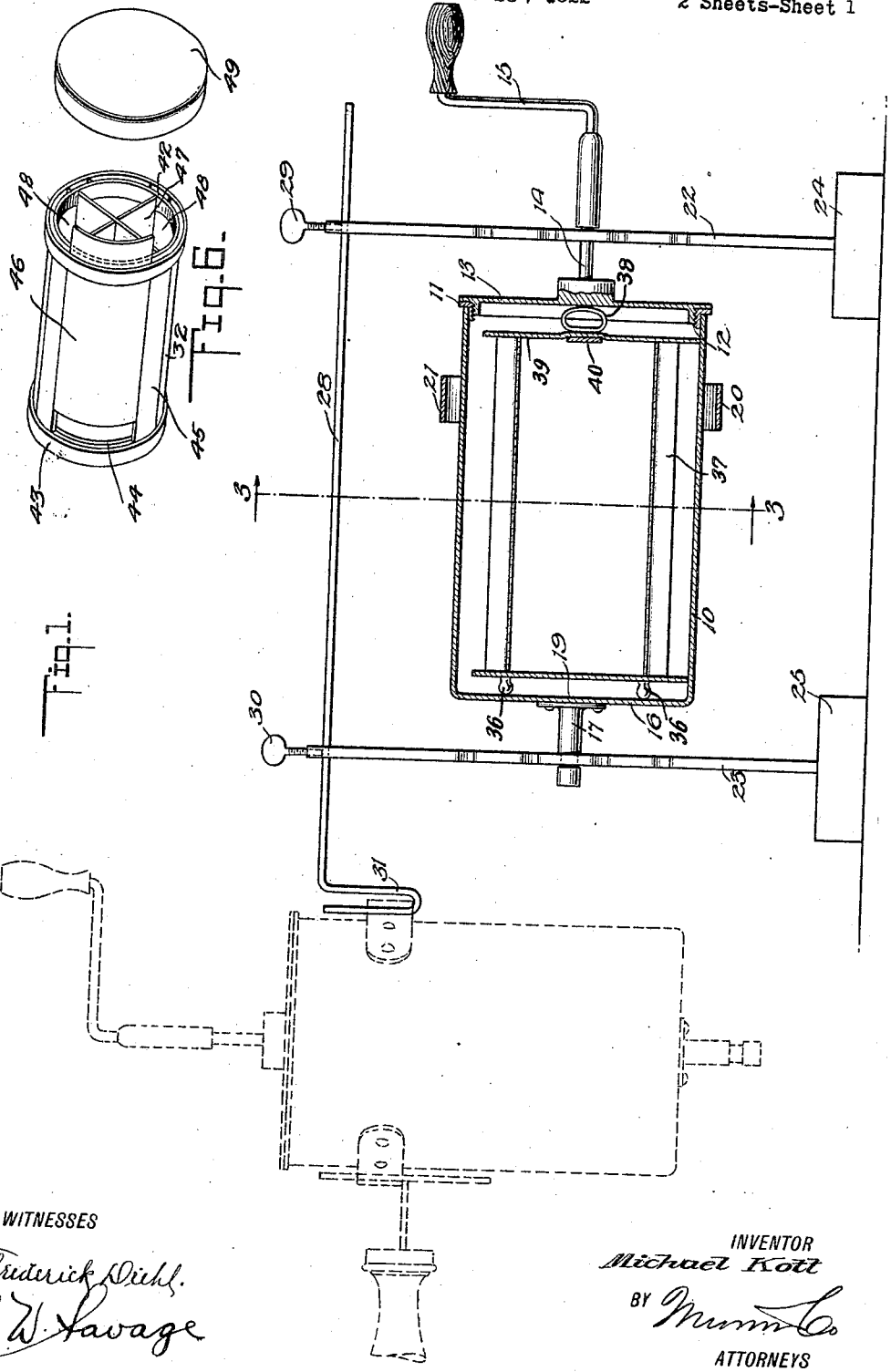
Figure 1 is a side elevation showing a section through the drum.
Figure 2:
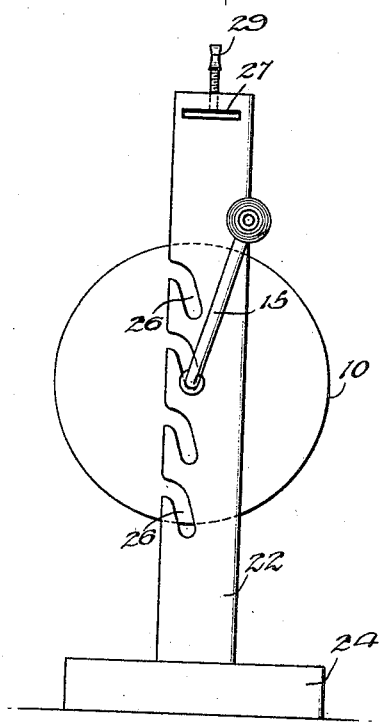
Figure 2 is an end elevation.
Figure 3:
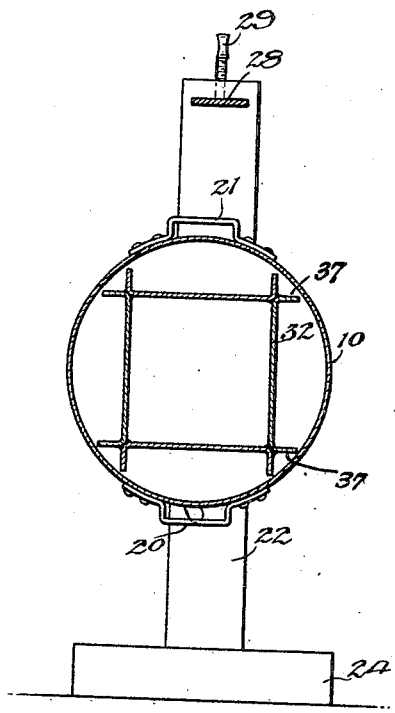
Figure 3 is a section along the line 3—3, Figure 1.
Figure 4:
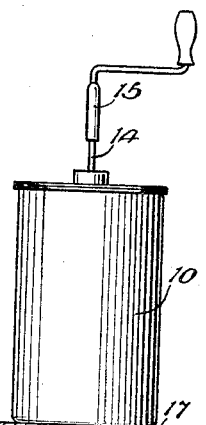
Figure 4 is a side elevation of the drum mounted on a supporting block.
Figure 5:
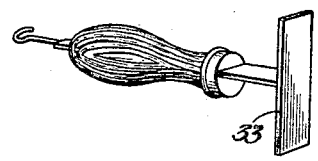
Figure 5 is a perspective view of a lifting device provided in conjunction with the cooking device for removing the drum from the source of heat after it has been heated.

Referring to the above-mentioned drawings, a drum or casing 10 has an annular ring 11 mounted in one end. This annular ring 11 is provided with an internal thread 12, and a cap 13 which engages with this annular ring 11 serves to close the end of the casing 10. Attached to the cap 13 is a trunnion 14 upon which a crank 15 is mounted. The end 16 of the casing 10 has a hollow trunnion 17 attached thereto in alinement with an opening 19 provided in the end 16. This opening 19 serves as a steam escape so that when steam is formed during the process of cooking there is no danger of the casing 10 being destroyed by excessive pressure. Attached to the casing 10 are lugs 20 and 21 to provide means whereby the casing may be lifted by the use of a T-shaped lifter 33.

In using the lifter 33, one end of the head is projected into one of the lugs 21. The head now lies along the side of the casing, serving to steady it when it is raised by means of the lifter. After the drum has been removed from the source of heat it may be supported by a block 34 having a vertical opening 35. When such a supporting block is provided the opening is made large enough to receive the hollow trunnion 17. A frame assemblage is provided for supporting the drum 10 above the source of heat. This frame assemblage consists of posts 22 and 23 attached to base blocks 24 and 25, respectively. Each post is provided with a plurality of notches 26 adapted to receive the trunnions 14 and 17. Extending through the upper ends of the posts 22 and 23 are openings 27 through which a bar 28 may be projected. Set screws 29 and 30 are provided in conjunction with the posts 22 and 23 and engage in threaded openings which extend lengthwise of the posts. These set screws are used for engaging the bar 28 so as to fix it in position in the openings 27. This bar 28 serves as a means for spacing the posts 22 and 23 so that they are the proper distance apart to receive the trunnions 14 and 17. On one end of the bar 28 a hook 31 is formed which may be used for supporting the drum 10 after it has been removed from over the source of heat. In Figure 1, the drum 10 is shown in dotted lines mounted on the hook 31.

A container 32 is provided for holding the victuals to be cooked. This container, shown in the illustration disclosing one embodiment of the invention, includes a body portion of square cross section having a plurality of longitudinal walls 37 each extending outward. Mounted on the lower end of the container are a plurality of feet 36 for spacing it from the end of the drum so that the steam from the cooking victuals may circulate. Attached to the upper end of the container are two crossbars 39 and 40 to which a ring 38 is fixed. This ring 38 is for lifting the container from the drum. When it is desired to cook steaks or the like they are placed between the longitudinal walls which serve to retain them in position and to revolve them with the container. A container that is provided for cooking steaks or the like is usually made to fit loosely into the drum so that after the steaks are placed in position no difficulty will be experienced in inserting the whole into the drum.

If it is desired to cook vegetables or chopped meats a container 32 of the type shown in Figure 6 is used. In constructing the container 32 shown in Figure 6 two pairs of rings 41, 42 and 43, 44 are provided. The rings 42 and 44 are smaller in diameter than the rings 41 and 43 and are mounted inside of the latter, respectively. Vertical members 45 are projected between the rings of each pair and serve to retain the pairs of rings in spaced relation to one another. Four of these vertical members 45 are provided and spaced equally about the rings 41 to 44, inclusive. Curved plates 46 are slidably mounted in the rings between the vertical members 45. Partitions 47 are mounted in the container, dividing it into four compartments 48. The partitions are located in alinement with the vertical members 45. Thus a plurality of compartments 48 for holding chopped meats or vegetables to which access may be gained by the removal of the plates 46 is provided. A cap 49 for closing the upper end of the container and for retaining the plates 46 in position is provided. The lower end of the container is closed by a head mounted in the ring 44. When a container of this type is used it is made of such a size that it fits tightly into the drum 10. Many different constructions of containers might be made and it is not permitted in this application to disclose the various types that might be used.

In using this cooking device, after the victuals to be cooked have been placed in the container 32, it is projected into the drum 10. When the cap 13 is placed in position the drum is supported over a source of heat by means of the posts 22 and 23 which engage the trunnions 14 and 17. During the cooking process the drum is continually rotated by means of the crank 15 so as to continuously expose different surfaces in the direct line of the flow of heat. By this means the victuals contained in the drum are protected from burning. The steam generated during the cooking process may escape through the opening 19 in the hollow trunnion 17, thus eliminating any possibility of destruction of the device by excessive steam pressure.

In using a cooking device of this type, meat may be cooked in from seven to ten minutes, thus allowing a great saving in fuel. It also eliminates the smell of greases and the like which are usually developed in the ordinary methods of cooking. These features are of extreme importance where it is necessary to do the cooking in a living room.

I would state in conclusion that while the illustrated examples constitute practical embodiments of my invention I do not limit myself strictly to the exact details herein illustrated since manifestly the same can be considerably varied without departing from the spirit of the invention as defined in the appended claims.

Claims:

1. A cooking device of the class described, comprising a drum having a removable end and a steam escape opening in the other end, removable means for supporting the victuals to be cooked in the drum, means for rotatably mounting said drum above a source of heat, and means for rotating said drum.

2. A cooking device of the class described, comprising a drum having a removable end and a steam escape opening in the other end, means for supporting the victuals to be cooked in said drum, a shaft attached to said drum, an adjustable frame provided with means for receiving said drum shaft to support it so that it may be rotated, and means provided in conjunction with the shaft for rotating it.

3. A device of the class described for supporting victuals above a source of heat to cook the same, comprising an adjustable frame, a drum rotatably mounted above said source of heat on said frame, lugs provided on the drum, and means for engaging in said lugs to remove the drum from the frame after it has been heated.

4. A cooking device of the class described for supporting victuals above a source of heat, comprising an adjustable frame including posts provided with a plurality of notches, a drum having a removable end and a steam escape opening in the other end, a shaft attached to said drum for fitting into said notches provided in the frame posts to rotatably support the drum at different distances above the source of heat, and means provided in conjunction with the shaft for rotating it.

5. A cooking device of the character described, comprising an adjustable frame, a drum, means provided on the drum for rotatably mounting it in the adjustable frame, a container for victuals removably mounted in the drum, and means for revolving the drum.

6. In a cooking device of the character described including a drum and a shaft attached to said drum, an adjustable supporting frame comprising a pair of notched supports, said notches being provided for receiving the drum shaft, a connecting rod extending between said notched supports, and means for attaching said connecting rod to the notched supports to fix them in different relative positions to one another.

MICHAEL KOTT.